US008897025B2

(12) United States Patent
Urase et al.

(10) Patent No.: US 8,897,025 B2
(45) Date of Patent: Nov. 25, 2014

(54) ULTRASONIC SENSOR

(75) Inventors: Hiroshi Urase, Kariya (JP); Yasushi Nagano, Ise (JP)

(73) Assignee: Panasonic Corporation, Osaka (JP)

( * ) Notice: Subject to any disclaimer, the term of this patent is extended or adjusted under 35 U.S.C. 154(b) by 266 days.

(21) Appl. No.: 13/426,959

(22) Filed: Mar. 22, 2012

(65) Prior Publication Data
US 2012/0243189 A1 Sep. 27, 2012

(30) Foreign Application Priority Data
Mar. 22, 2011 (JP) .................. 2011-062604

(51) Int. Cl.
*H05K 5/00* (2006.01)
*G01S 7/521* (2006.01)
*G10K 11/00* (2006.01)

(52) U.S. Cl.
CPC ............... *G01S 7/521* (2013.01); *G10K 11/004* (2013.01)
USPC .......................................... 361/752; 361/728

(58) Field of Classification Search
USPC ................... 361/728–730, 752, 796, 800
See application file for complete search history.

(56) References Cited

U.S. PATENT DOCUMENTS 5,648,697 A * 7/1997 Pirrung et al. ............... 310/338
5,987,992 A * 11/1999 Watanabe et al. ............ 73/632
6,532,193 B1 * 3/2003 Fehse et al. .................. 367/140
6,862,935 B2 * 3/2005 Fukuda et al. ................ 73/602
7,343,803 B2 * 3/2008 Triebl et al. .................. 73/632
2007/0237031 A1 * 10/2007 Kawashima et al. ......... 367/140
2011/0088479 A1 * 4/2011 Urase et al. ................... 73/649
2012/0032791 A1 * 2/2012 Horikawa et al. ............. 340/435
2012/0176866 A1 * 7/2012 Urase et al. ................... 367/140

FOREIGN PATENT DOCUMENTS

| JP | 2003-214902 A | 7/2003 |
| JP | 2005-24351 | 1/2005 |
| JP | 2007-281999 A | 10/2007 |
| JP | 4609537 B2 | 1/2011 |

OTHER PUBLICATIONS

Chinese Office Action dated Nov. 19, 2013 in corresponding Chinese Application No. 201210076454.8 and English translation thereof.

* cited by examiner

*Primary Examiner* — Hung S Bui
(74) *Attorney, Agent, or Firm* — Bacon & Thomas, PLLC

(57) ABSTRACT

An ultrasonic sensor includes a transceiver block having a transceiver device for transmitting and receiving ultrasonic waves and a circuit board mounted with an electronic circuit for processing ultrasonic signals transmitted and received through the transceiver device. A housing of the ultrasonic sensor has an opening and a communication hole, and the circuit board is stored into the housing through the opening. The transceiver block is attached to the housing. An electric connector extends through the communication hole of the housing to electrically interconnect the transceiver device and the electronic circuit of the circuit board; and a cover member closes the opening of the housing. The communication hole is sealed by a filler material.

10 Claims, 3 Drawing Sheets

ULTRASONIC SENSOR

FIELD OF THE INVENTION

The present invention relates to an ultrasonic sensor that is mounted on, e.g., a motor vehicle to be used for obstacle detection or the like.

BACKGROUND OF THE INVENTION

Conventionally, there is available an ultrasonic sensor that includes, as shown in FIG. 4, a hollow housing 101 having an opening on one surface thereof and a transceiver device (transceiver block) 102 having a transceiving surface for transmitting and receiving ultrasonic waves, the transceiving surface exposed on the other surface of the housing 101. The ultrasonic sensor includes a circuit board 103 arranged within the housing 101 and mounted with an electronic circuit for processing ultrasonic waves transmitted and received through the transceiver device 102 and a wiring line 104 electrically interconnecting the transceiver device 102 and the circuit board 103. The ultrasonic sensor further includes a cover member 105 provided to cover the opening of the housing 101 and a terminal 106 connected at one end to the electronic circuit of the circuit board 103 and at the other end to a power supply terminal (not shown).

When used in a motor vehicle, the ultrasonic sensor is installed in a portion highly susceptible to drenching and severe vibrating, e.g., a bumper or a front grill. In many conventional ultrasonic sensors, therefore, a filler material 107 having hydrophobicity and elasticity, such as silicone or urethane, is filled in the housing 101 accommodating the circuit board 103. It is typical that a waterproof property and a vibration resistance are obtained by filling the filler material 107 in the housing 101 in this manner (see, e.g., Japanese Patent Application Publication No. 2005-24351).

In the conventional example stated above, however, the weight and cost of the ultrasonic sensor is proportionately increased as the filler material 107 is filled in the housing 101. In addition, there is a possibility that, due to the existence of the filler material 107, distortions are generated in the circuit board 103 arranged within the housing 101. If the distortions are generated, it is likely that stresses are applied to the solder portions between the circuit board 103 and the electronic parts mounted on the circuit board 103, consequently generating cracks in the solder portions. It is also likely that the sensing area characteristics of the sensor are changed before and after filling the filler material 107. Other causes of generating distortions in the circuit board 103 include, e.g., an external load generated by the thermal expansion and shrinkage of the filler material 107. Examples of the change in the sensing area characteristics before and after filling the filler material 107 include the narrowing of a sensing area of the sensor.

SUMMARY OF THE INVENTION

In view of the above, the present invention provides an ultrasonic sensor capable of suppressing an increase in weight and cost while securing a waterproof property and capable of preventing generation of distortions in a circuit board.

In accordance with an aspect of the present invention, there is provided an ultrasonic sensor including: a transceiver block having a transceiver device for transmitting and receiving ultrasonic waves; a circuit board mounted with an electronic circuit for processing ultrasonic signals transmitted and received through the transceiver device; a housing having an opening and a communication hole, the circuit board being stored into the housing through the opening, the transceiver block being attached to the housing; an electric connector extending through the communication hole of the housing to electrically interconnect the transceiver device and the electronic circuit of the circuit board; and a cover member closing the opening of the housing, wherein the communication hole is sealed by a filler material.

The filler material sealing the communication hole may be filled in the transceiver block.

The electric connector may include a pin terminal electrically connected to the electronic circuit of the circuit board and a lead line connected at one end to the transceiver device and at the other end to the pin terminal.

The electric connector may include a lead line for electrically interconnecting the transceiver device and the electronic circuit of the circuit board.

The electric connector may include a bonding wire for electrically interconnecting the transceiver device and the electronic circuit of the circuit board.

The filler material may be formed of silicone, urethane, epoxy, a rubber material or a foamed material.

The filler material may be formed by combining at least two of silicone, urethane, epoxy, a rubber material and a foamed material.

With such configurations, it is possible to suppress an increase in weight and cost while securing a waterproof property and to prevent generation of distortions in the circuit board.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

One preferred embodiment of an ultrasonic sensor of the present invention will now be described with reference to the accompanying drawings. In the following description, the upper, lower, left and right sides in FIG. 1 will be defined as upper, lower, left and right directions.

Figure 1:
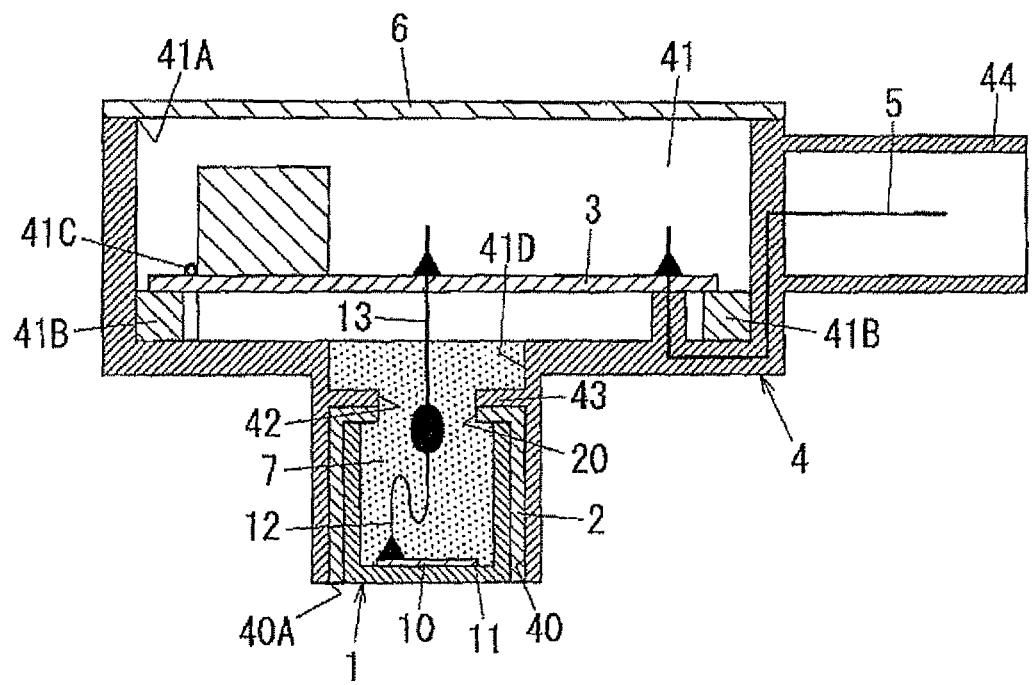
FIG. 1 is a section view showing an ultrasonic sensor according to one embodiment of the present invention.

Referring to FIG. 1, the ultrasonic sensor of the present embodiment includes a transceiver block 1 for transmitting and receiving ultrasonic waves, a cover 2 covering the outer circumferential surface of the transceiver block 1 except for the transceiving surface thereof and a circuit board 3 mounted with an electronic circuit for processing ultrasonic signals transmitted and received through the transceiver block 1. The ultrasonic sensor further includes a housing 4 having a device storing portion 40 for accommodation of the transceiver block 1 and a board storing portion 41 for accommodation of the circuit board 3. The board storing portion 41 has an opening 41A. An communication hole 42 through which the device storing portion 40 and the board storing portion 41 communicate with each other is formed in the housing 4. The ultrasonic sensor further includes an outer connection terminal 5 connected at one end to the circuit board 3 and at the other end to an external terminal (not shown) and a cover member 6 for closing the opening 41A of the board storing portion 41.

As shown in FIG. 1, the transceiver block 1 includes a transceiver device 10, which is formed of a piezoelectric element, and a case 11 for storing the transceiver device 10 therein. The case 11 is made of, e.g., black-colored polybutylene terephthalate, and is formed into a cylindrical closed-bottom shape with the upper surface thereof opened. The transceiver device 10 is arranged on the inner bottom portion of the case 11. The lower surface of the case 11 is used as a transceiving surface for transmitting and receiving ultrasonic waves.

The transceiver block 1 includes a lead line 12 electrically connected at one end to the transceiver device 10 and a rod-shaped pin terminal 13 soldered at one end to the lead line 12 and protruding at the other end to the outside of the case 11. The other end of the pin terminal 13 is inserted into an insertion hole (not shown) formed in the circuit board 3. In this state, the other end of the pin terminal 13 is soldered to the circuit board 3, whereby the pin terminal 13 is electrically connected to the electronic circuit mounted to the circuit board 3. In other words, the lead line 12 and the pin terminal 13 makes up an electric connector for electrically interconnecting the transceiver device 10 and the electronic circuit of the circuit board 3.

As shown in FIG. 1, the cover 2 is made of an elastic material and is formed into a cylindrical open-bottom shape with the lower surface thereof opened. The cover 2 is fixed to the outer circumferential surface of the case 11 to cover the transceiver block 1. A through-hole 20 for allowing the pin terminal 13 of the transceiver block 1 to pass therethrough is formed in the upper surface of the cover 2.

As shown in FIG. 1, the circuit board 3 is stored within the board storing portion 41 through the opening 41A. The pin terminal 13 extending through the through-hole 20 and the communication hole 42 is connected to the circuit board 3 by soldering.

As shown in FIG. 1, the housing 4 includes the hollow box-like board storing portion 41 having the opening 41A formed in the upper surface thereof and a cylindrical closed-bottom device storing portion 40 adjoining to the board storing portion 41 with a partition wall 43 forming the inner bottom portion of the board storing portion 41 interposed therebetween. The device storing portion 40 has an opening 40A formed in the lower surface thereof. A communication hole 42 for bringing the lower region of the board storing portion 41 and the upper region of the device storing portion 40 into communication with each other is formed in the partition wall 43 of the housing 4.

As shown in FIG. 1, the transceiver block 1 assembled with the cover 2 is inserted into the device storing portion 40 to reach a position where the transceiver block 1 makes contact with the partition wall 43. The transceiver block 1 is stored within the device storing portion 40 with the transceiving surface thereof exposed to the outside through the opening 40A.

As shown in FIG. 1, a pair of support ribs 41B and a pair of welding ribs 41C (only one of which is shown in FIG. 1) are formed on the bottom surface of the board storing portion 41 in such a fashion as to protrude upward. The support ribs 41B are formed at the left and right end portions of the bottom surface of the board storing portion 41. The left and right end portions of the circuit board 3 are placed on the support ribs 41B. Just like the support ribs 41B, the welding ribs 41C are formed at the left and right end portions of the bottom surface of the board storing portion 41. When the welding ribs 41C are welded to the circuit board 3, the tip end portions of the welding ribs 41C are bent and welded to the upper surface of the circuit board 3. Accordingly, the circuit board 3 is gripped and fixed by the support ribs 41B and the welding ribs 41C.

In the bottom of the board storing portion 41, a recess portion 41D is formed in a position corresponding to the device storing portion 40 as shown in FIG. 1. One end of the communication hole 42 is opened in the bottom surface of the recess portion 41D.

As shown in FIG. 1, the outer connection terminal 5 is one-piece molded with the housing 4 by insert-molding such that the outer connection terminal 5 extends through the outer wall of the housing 4. One end of the outer connection terminal 5 protrudes into a cylindrical connector portion 44 protruding from the outer surface of the housing 4. The other end of the outer connection terminal 5 protrudes into the board storing portion 41. In this regard, one end of outer connection terminal 5 is connected to an external terminal (not shown). The other end of the outer connection terminal 5 protrudes from the bottom surface of the board storing portion 41 and is electrically connected to the circuit board 3 by soldering or the like.

The electronic circuit of the circuit board 3 is supplied with electric power from an external power supply (not shown) through the outer connection terminal 5. The electronic circuit outputs a drive pulse signal to the transceiver device 10. Responsive to the drive pulse signal, the transceiver device 10 transmits ultrasonic waves to the outside. If the transceiver device 10 receives ultrasonic waves reflected from an obstacle, the transceiver device 10 outputs a wave receiving signal to the electronic circuit of the circuit board 3. The electronic circuit of the circuit board 3 calculates the distance to the obstacle by measuring the time taken until the wave receiving signal is inputted after outputting the drive pulse signal. Then, the electronic circuit outputs a signal indicating the calculation result to an external control circuit (not shown) through the outer connection terminal 5.

The cover member 6 is made of, e.g., transparent white polybutylene terephthalate, and is attached to the board storing portion so as to cover the opening 41A. The peripheral edge portion of the cover member 6 and the peripheral edge portion of the opening 41A of the board storing portion 41 are joined to each other by ultrasonic welding or laser welding. Since the opening 41A of the board storing portion 41 is closed by the cover member 6, it is possible to prevent water from infiltrating into the board storing portion 41 from the outside through the opening 41A of the board storing portion 41. The welding method is not limited to the ultrasonic welding or the laser welding but may be, e.g., vibration welding or other welding methods. In addition, an adhesive agent may be used in place of the welding. While the cover member 6 is used as a means for closing the opening 41A of the board storing portion 41 in the present embodiment, the closing means is not limited to the cover member 6 as long as it can close the opening 41A.

The transceiver block 1 used herein is of a closed type. A filler material 7 made of silicone having hydrophobicity and elasticity is filled in the case 11 of the transceiver block 1. By filling the filler material 7 in the case 11, it is possible to restrain generation of vibrations within the case 11 and to prevent water or dust from infiltrating into the case 11 from the outside.

In the present embodiment, as shown in FIG. 1, the filler material 7 is also filled in the communication hole 42, the through-hole 20 and the recess portion 41D, thereby closing the communication hole 42. The board storing portion 41 is hermetically sealed with respect to the outside by closing the opening 41A with the cover member 6 and sealing the communication hole 42 with the filler material 7. This makes it possible to prevent water from infiltrating into the board storing portion 41 from the outside through the device storing portion 40 and the communication hole 42.

In the present embodiment, the communication hole 42 is sealed by the filler material 7 as described above, which makes it possible to close the board storing portion 41 without having to fill the filler material 7 in the board storing portion 41. Thus the filler material 7 which may apply stresses to the circuit board 3 does not exist around the circuit board 3. Accordingly, it is possible to suppress an increase in weight and cost while securing a waterproof property and to prevent generation of distortions in the circuit board 3. Since the filler material 7 filled in the case 11 of the transceiver block 1 is also used as a filler material for sealing the communication hole 42, it is only necessary to fill the filler material 7 once. This makes it possible to reduce the number of steps in the manufacturing process.

As the filler material 7, it may be possible to use, e.g., urethane, epoxy, a rubber material or a foamed material, instead of silicone. Moreover, the combination of at least two of the materials stated above may be used as the filler material 7.

Figure 2:
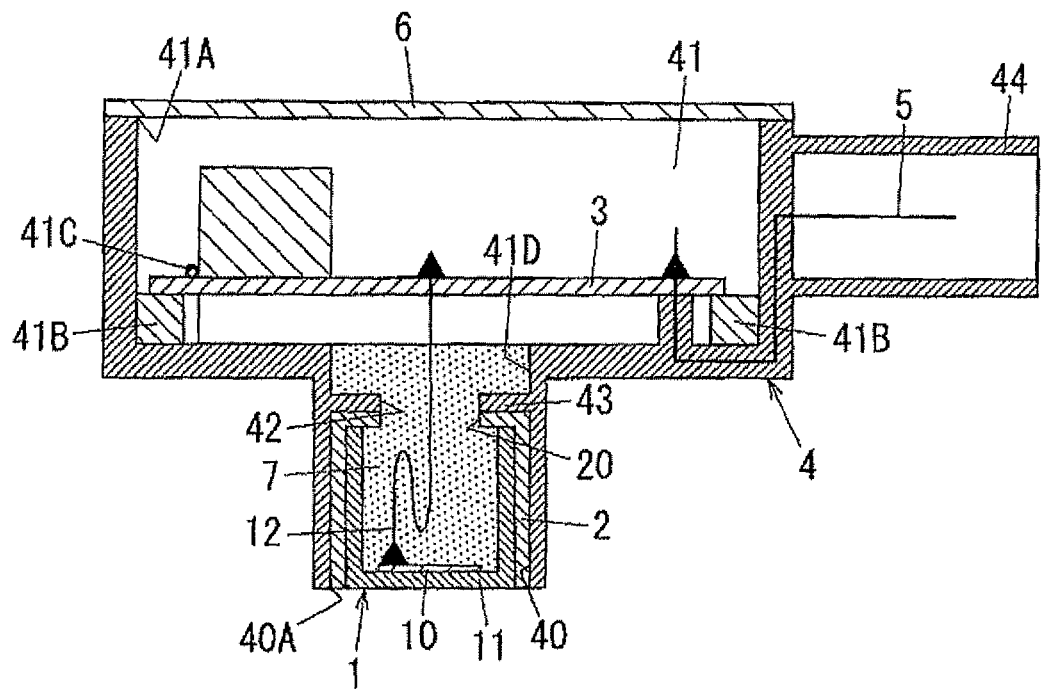
FIG. 2 is a section view showing one modified example of the ultrasonic sensor shown in FIG. 1.

In the present embodiment, as shown in FIG. 1, the transceiver device 10 and the electronic circuit of the circuit board 3 are electrically connected to each other by the lead line 12 and the pin terminal 13. Alternatively, as shown in FIG. 2, the transceiver device 10 and the electronic circuit of the circuit board 3 may be connected to each other through the use of only the lead line 12. In place of the lead line 12 and the pin terminal 13, a bonding wire may be used to electrically interconnect the transceiver device 10 and the electronic circuit of the circuit board 3.

Figure 3:
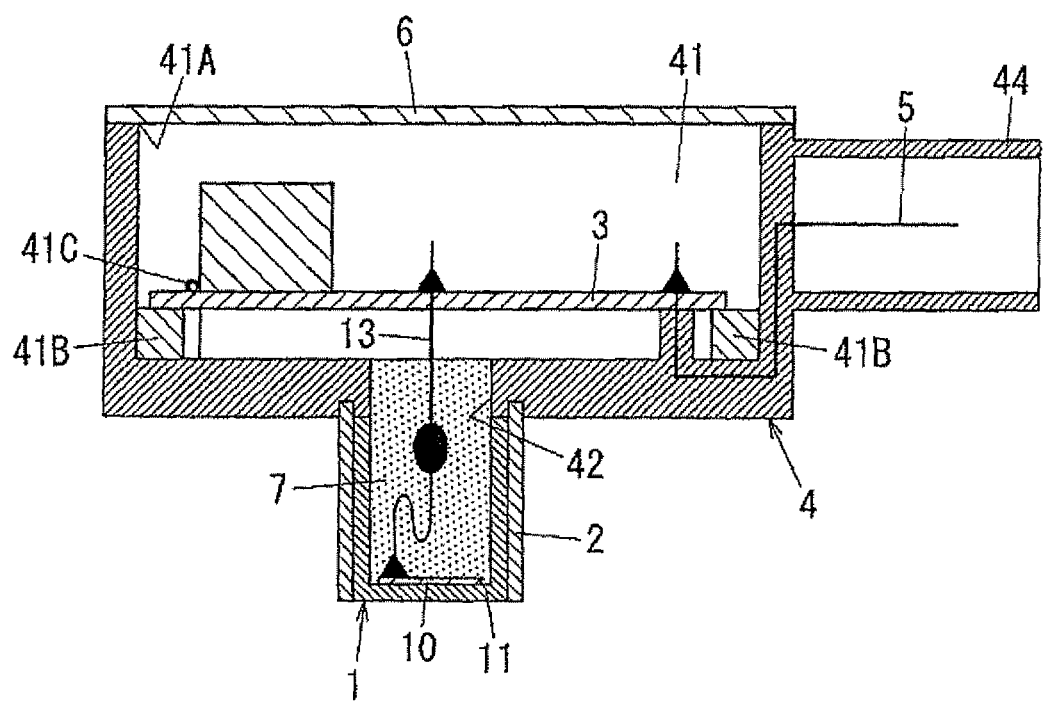
FIG. 3 is a section view showing another modified example of the ultrasonic sensor shown in FIG. 1.
Figure 4:
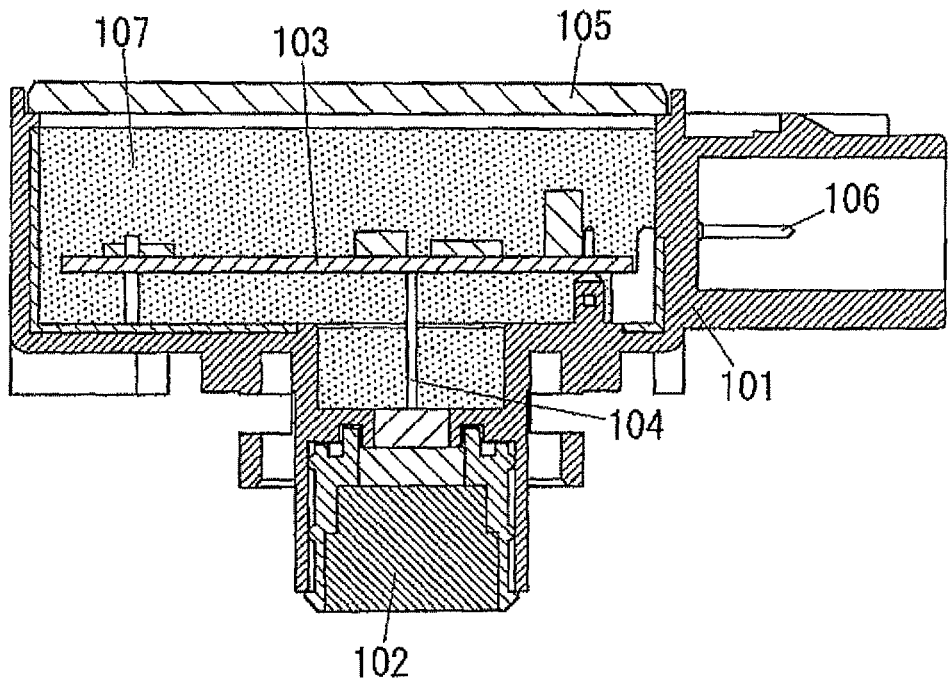
FIG. 4 is a section view illustrating a conventional ultrasonic sensor.

In the present embodiment, the transceiver block 1 is stored within the device storing portion 40. Alternatively, as shown in FIG. 3, it may be possible to employ a configuration in which the transceiver block 1 is attached to the portion of the housing 4 other than the device storing portion 40. In this configuration, the transceiver block 1 is attached to the housing 4 by attaching the cover 2 holding the transceiver block 1 to the peripheral edge of the communication hole 42 on the lower surface of the housing 4 and fixing the transceiver block 1 with the filler material 7.

While the invention has been shown and described with respect to the embodiments, it will be understood by those skilled in the art that various changes and modification may be made without departing from the scope of the invention as defined in the following claims.

What is claimed is:

1. An ultrasonic sensor, comprising:
a transceiver block having a transceiver device for transmitting and receiving ultrasonic waves;
a circuit board mounted with an electronic circuit for processing ultrasonic signals transmitted and received through the transceiver device;
a housing having an opening and a communication hole, the circuit board being stored into the housing through the opening, the transceiver block being attached to the housing;
an electric connector extending through the communication hole of the housing to electrically interconnect the transceiver device and the electronic circuit of the circuit board; and
a cover member closing the opening of the housing,
wherein a filler material seals the communication hole without filling around the circuit board; and
wherein the filler material sealing the communication hole is filled in the transceiver block.

2. The ultrasonic sensor of claim 1, wherein the electric connector includes a pin terminal electrically connected to the electronic circuit of the circuit board and a lead line connected at one end to the transceiver device and at the other end to the pin terminal.

3. The ultrasonic sensor of claim 1, wherein the electric connector includes a lead line for electrically interconnecting the transceiver device and the electronic circuit of the circuit board.

4. The ultrasonic sensor of claim 1, wherein the electric connector includes a bonding wire for electrically interconnecting the transceiver device and the electronic circuit of the circuit board.

5. The ultrasonic sensor of claim 1, wherein the filler material is formed of silicone.

6. The ultrasonic sensor of claim 1, wherein the filler material is formed of urethane.

7. The ultrasonic sensor of claim 1, wherein the filler material is formed of epoxy.

8. The ultrasonic sensor of claim 1, wherein the filler material is formed of a rubber material.

9. The ultrasonic sensor of claim 1, wherein the filler material is formed of a foamed material.

10. The ultrasonic sensor of claim 1, wherein the filler material is formed by combining at least two of silicone, urethane, epoxy, a rubber material and a foamed material.

\* \* \* \* \*